United States Patent
Kagawa et al.

(10) Patent No.: US 9,683,573 B2
(45) Date of Patent: Jun. 20, 2017

(54) MOTOR CONTROL APPARATUS AND ELECTRIC PUMP UNIT

(71) Applicant: JTEKT CORPORATION, Osaka-shi (JP)

(72) Inventors: Hiroki Kagawa, Kashiba (JP); Kengo Uda, Okazaki (JP); Yasuyuki Aoki, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 287 days.

(21) Appl. No.: 14/369,312

(22) PCT Filed: Dec. 27, 2012

(86) PCT No.: PCT/JP2012/083799
§ 371 (c)(1),
(2) Date: Jun. 27, 2014

(87) PCT Pub. No.: WO2013/100017
PCT Pub. Date: Jul. 4, 2013

(65) Prior Publication Data
US 2015/0010408 A1    Jan. 8, 2015

(30) Foreign Application Priority Data

Dec. 28, 2011 (JP) .................... 2011-288171

(51) Int. Cl.
*F04D 27/00* (2006.01)
*F04D 25/06* (2006.01)
(Continued)

(52) U.S. Cl.
CPC ............ *F04D 27/001* (2013.01); *F04B 49/06* (2013.01); *F04B 49/08* (2013.01); *F04D 25/06* (2013.01);
(Continued)

(58) Field of Classification Search
CPC .. F04B 49/06; F04B 49/08; F04B 2203/0201; F04B 2205/05; F04D 27/001;
(Continued)

(56) References Cited

U.S. PATENT DOCUMENTS

| 3,394,622 A | * | 7/1968 | Chana | ................... F16H 61/068 137/54 |
| 2002/0091034 A1 | * | 7/2002 | Nakamori | .............. B60K 6/485 477/3 |

(Continued)

FOREIGN PATENT DOCUMENTS

| CN | 1661235 A | 8/2005 |
| CN | 101111680 A | 1/2008 |

(Continued)

OTHER PUBLICATIONS

Office Action issued Oct. 6, 2015 in Japanese Patent Application No. 2011-288171 (with English language translation).

(Continued)

*Primary Examiner* — Dominick L Plakkoottam
*Assistant Examiner* — Connor Tremarche
(74) *Attorney, Agent, or Firm* — Oblon, McClelland, Maier & Neustadt, L.L.P.

(57) ABSTRACT

A control unit includes an excessive output suppression control unit which suppresses an excessive output by reducing a current command value from a host control apparatus. A control signal output unit obtains a motor control signal by adding a reduction amount of the current command value to the current command value. The excessive output suppression control unit includes: an oil pressure estimating unit which estimates oil pressure based on a current and a rotating speed of the electric motor; and a current command value correction amount calculating unit which compares outputs the reduction amount of the current command value (Continued)

if the estimated oil pressure is higher than target oil pressure. One of the target oil pressure and the estimated oil pressure compared by the current command value correction amount calculating unit is corrected based on oil temperature information.

9 Claims, 6 Drawing Sheets

(51) Int. Cl.
*F04B 49/06* (2006.01)
*F16H 61/02* (2006.01)
*F16H 59/68* (2006.01)
*F04B 49/08* (2006.01)
*F16H 61/00* (2006.01)
*F16H 59/72* (2006.01)

(52) U.S. Cl.
CPC ......... *F16H 59/68* (2013.01); *F16H 61/0021* (2013.01); *F16H 61/0031* (2013.01); *F16H 61/02* (2013.01); *F04B 2203/0201* (2013.01); *F04B 2205/05* (2013.01); *F16H 2059/683* (2013.01); *F16H 2059/725* (2013.01); *F16H 2061/0093* (2013.01)

(58) Field of Classification Search
CPC ...... F04D 25/06; F16H 59/68; F16H 61/0021; F16H 61/0031; F16H 61/02; F16H 2059/683; F16H 2059/725; F16H 2061/0093; G05B 1/11; G05B 13/00; Y10S 388/909; Y10S 388/923; Y10S 388/924; Y10S 388/925; Y10S 388/926; Y10S 388/927; Y10S 388/929
USPC ........................................................ 417/42
See application file for complete search history.

(56) References Cited

U.S. PATENT DOCUMENTS

| | | |
|---|---|---|
| 2005/0183416 A1 | 8/2005 | Hayashi et al. |
| 2006/0120876 A1 | 6/2006 | Kitano et al. |
| 2008/0253904 A1* | 10/2008 | Kai ................. F04C 14/065 417/310 |
| 2009/0035151 A1 | 2/2009 | Sugiura et al. |
| 2011/0135499 A1 | 6/2011 | Lee et al. |
| 2013/0171008 A1 | 7/2013 | Uda et al. |
| 2013/0171010 A1 | 7/2013 | Kagawa |

FOREIGN PATENT DOCUMENTS

| | | |
|---|---|---|
| CN | 201031823 Y | 3/2008 |
| EP | 1 598 555 A1 | 11/2005 |
| JP | 2002-5034 | 1/2002 |
| JP | 2002005034 A * | 1/2002 |
| JP | 2002-206630 | 7/2002 |
| JP | 2002-227986 A | 8/2002 |
| JP | 2002-235675 | 8/2002 |
| JP | 2004-144020 | 5/2004 |
| JP | 2004144020 A * | 5/2004 |
| JP | 2009-185915 A | 8/2009 |
| JP | 2010-35281 A | 2/2010 |
| JP | 2010-116914 | 5/2010 |
| JP | 2010-180731 | 8/2010 |
| JP | 2010180731 A * | 8/2010 |
| JP | 2011-38601 A | 2/2011 |

OTHER PUBLICATIONS

Combined Office Action and Search Report issued Jul. 30, 2015 in Chinese Patent Application No. 201280065618.5 (with English language translation).
International Search Report issued Mar. 19, 2013, in PCT/JP2012/083799, filed Dec. 27, 2012.
Extended European Search Report issued Feb. 15, 2017 in Patent Application No. 12863337.7.

* cited by examiner

MOTOR CONTROL APPARATUS AND ELECTRIC PUMP UNIT

TECHNICAL FIELD

The present invention relates to a motor control apparatus and an electric pump unit, and more particularly, to a motor control apparatus for an electric pump unit which is suitable for supplying oil pressure to a transmission of a motor vehicle and an electric pump unit which includes this motor control apparatus.

BACKGROUND ART

In related art, as an apparatus for supplying oil pressure to a transmission of a motor vehicle, there has been used an apparatus which includes only a main pump driven by an engine serving as a main power supply.

However, in order to implement a start-stop function for allowing an engine to stop when a motor vehicle stops, it is necessary to provide two oil pressure sources such as a conventional main pump and an auxiliary pump driven by an electric motor driven by a battery as a power source so as to ensure supply of oil pressure to a drive system such as the transmission even while the engine stops due to stop of idling. Patent Document 1 describes an oil pressure supply apparatus for a transmission including two oil pressure sources as described above. This oil pressure supply apparatus supplies oil pressure to the transmission, and an auxiliary pump configures an electric pump unit together with an electric motor which drives the auxiliary pump and a motor control apparatus. When oil pressure in a main oil discharge path from the main pump to the transmission is equal to or higher than a predetermined value, the driving of the auxiliary pump is stopped, whereas when the oil pressure in the main oil discharge path is lower than the predetermined value, the auxiliary pump is driven. The oil pressure supplied by the main pump is several tens times larger than oil pressure supplied by the auxiliary pump. Since a measuring range of an oil pressure sensor is set based on the magnitude of the oil pressure supplied by the main pump, using this measuring range for controlling the oil pressure of the auxiliary pump results in an insufficient measuring accuracy, and hence, it becomes difficult to control the oil pressure of the auxiliary pump. In driving of the auxiliary pump, oil pressure equal to or higher than target oil pressure is obtained by driving the electric motor based on a current command value from a host ECU.

RELATED ART DOCUMENTS

Patent Documents

Patent Document 1: JP-A-2010-116914

SUMMARY OF THE INVENTION

Problem to be Solved by the Invention

In the related-art electric pump unit described above, the electric motor is driven based on the current command value irrespective of the existence of a load on the electric motor, which may cause a state in which an output equal to or larger than required (an excessive output) is produced. The excessive output is not preferable from the viewpoint energy saving and suppression of the generation of heat and noise. In order to suppress the excessive output, it is preferable to obtain actual oil pressure to control the electric motor based on the actual oil pressure, but it requires an oil pressure sensor having a measuring range suitable for the electric pump unit in addition to the oil pressure sensor for the main pump, which increases the cost involved. Consequently, it is a problem to estimate the oil pressure of the pump with good accuracy so as not to require the oil pressure sensor for the electric pump unit.

An object of the invention is to solve the above-described problem and to provide a motor control apparatus and an electric pump unit which can suppress generation of heat and noise to a minimum by suppressing an excessive output by and which does not require an oil pressure sensor for suppressing the excessive output.

Means for Solving the Problem

The present invention provides a motor control apparatus which controls, based on oil pressure, an electric motor which drives a pump which sucks and discharges oil, the motor control apparatus including: a control unit including a control signal output unit which outputs a motor control signal; and a drive circuit which operates in response to an input of the motor control signal to supply driving electric power to the electric motor, wherein the control unit further includes an excessive output suppression control unit which suppresses an excessive output by reducing a current command value from a host control apparatus, wherein the control signal output unit obtains the motor control signal by adding a reduction amount of the current command value obtained by the excessive output suppression control unit to the current command value from the host control apparatus, wherein the excessive output suppression control unit includes: an oil pressure estimating unit which estimates oil pressure based on at least a current and a rotating speed of the electric motor; and a current command value correction amount calculating unit which compares target oil pressure with the estimated oil pressure estimated by the oil pressure estimating unit, and which outputs the reduction amount of the current command value to the control signal output unit if the estimated oil pressure is higher than the target oil pressure, and wherein one of the target oil pressure and the estimated oil pressure which are compared with each other by the current command value correction amount calculating unit is corrected based on oil temperature information.

In the excessive output suppression control unit, the reduction amount of the current command value from the host control apparatus is obtained, and the motor control signal output from the control signal output unit is obtained by adding the reduction amount to the current command value from the host control apparatus. The excessive output suppression control unit outputs the reduction amount of the current command value to the control signal output unit if the estimated oil pressure is higher than the target oil pressure based on the target oil pressure set in advance and the estimated oil pressure which changes as a result of drive of the electric motor. Consequently, the actual oil pressure can be reduced to be lower than the oil pressure obtained by the control based on the current command value from the host control apparatus, while the target oil pressure is satisfied, whereby the output of the electric motor can be suppressed.

It is preferable that the actual oil pressure is estimated from data obtained from the electric motor so as not to provide an additional oil pressure sensor for the electric pump unit. The oil pressure is estimated by the oil pressure estimating unit which estimates the oil pressure from at least the current and rotating speed of the electric motor (only these two pieces of information may be used, and for example, a ratio between reference voltage and power supply voltage may also be used as necessary). In estimating the oil pressure, since an estimated value changes based on oil temperatures, i.e., viscosities of the oil used. Therefore, the accuracy of the excessive output suppression control is enhanced by correcting the estimated oil pressure value or the target oil pressure value based on the oil temperature information (the estimated oil pressure may be corrected based on the oil temperature information while the target oil pressure is held to the set value, or reversely, the set value of the target oil pressure may be corrected based on the oil temperature information).

In this way, it is possible to perform control to provide an appropriate output (which involves neither an insufficient output which is less than a required output nor the excessive output) without an additional oil pressure sensor for suppression of an excessive output, whereby it is possible to suppress the generation of heat and noise to a minimum.

When the estimated oil pressure is corrected based on the oil temperature information, the use of an oil pressure estimation map prepared for a plurality of oil temperature zones or an oil pressure estimation operation expression can enhance the oil pressure estimation accuracy, whereby the accuracy of the excessive output suppression control is enhanced.

The oil pressure estimation map prepared for the plurality of oil temperature zones may include a plurality of maps which are provided so as to correspond to the respective oil temperature zones, or may include a standard map which is set as a map for a standard temperature and adjustment coefficients which are set to correspond to the respective oil temperature zones.

An oil pressure-flow rate curve of the pump is set to satisfy a required oil pressure value. In the oil pressure-flow rate curve comprises an inflection point which exceeds the required oil pressure value, and from the inflection point, a flow rate decreases as the oil pressure increases. In an oil pressure estimation map for a high oil temperature zone among the oil pressure estimation maps for the plurality of oil temperature zones, it is preferable to provide an allowance margin so as to satisfy the required oil pressure value even when the oil temperature decreases by a predetermined amount.

Since the oil temperature is decreased by an outside air temperature, the actual oil temperature may decrease to a medium temperature zone while a high temperature zone control is executed. When the high temperature zone control is executed in a state in which the actual oil temperature falls within the medium temperature zone, the oil pressure may decrease below a required output point. Consequently, by providing the allowance margin in the high temperature zone, it is possible to ensure the required output in the high temperature zone which is liable to be affected by a decrease in oil temperature.

It is preferable that the control signal output unit further includes a filtering process unit which allows the rotating speed of the electric motor to change along a predetermined gradient or lower.

When the oil pressure estimation maps corresponding to the plurality of oil temperature zones are used, at the time of switching of the oil pressure estimation maps from one to another due to the change of the oil temperature to fall within the different oil temperature zone, the rotating speed of the electric motor changes. When the rotating speed of the motor changes, the frequency of noise generated by the pump changes. When the frequency of this change is large, the noise becomes remarkable, and the user may be caused to feel the sensation of physical discomfort. By allowing the rotating speed of the electric motor to change along the predetermined gradient or lower by using the filtering process unit of the control signal output unit, the rotating speed of the electric motor changes moderately, whereby the user is prevented from being caused to feel the sensation of physical discomfort.

The current of the electric motor used in estimating the oil pressure by the oil pressure estimating unit may be a power supply current or a motor current. In addition, the current value may be a measured value or an estimated value. The rotating speed of the electric motor can be obtained from an output of a phase detection circuit provided on the motor, but the present invention is not limited thereto. It is preferable that the oil pressure estimating unit corrects the oil pressure further based on a power supply voltage.

The electric pump unit of the invention includes: a pump which sucks and discharges oil; a pump driving electric motor; and a motor control apparatus which controls the electric motor based on oil pressure, and the motor control apparatus is the motor control apparatus according to any of those described above.

Advantages of the Invention

According to the electric pump unit of the invention, as described above, the oil pressure is estimated with good accuracy, and the actual oil pressure can be decreased while the target oil pressure is ensured. Consequently, it is possible to perform control to provide the appropriate output (which involves neither an insufficient output which is less than a required output nor an excessive output), whereby it is possible to suppress the generation of heat and noise caused by an excessive output.

MODE FOR CARRYING OUT THE INVENTION

Hereinafter, an embodiment in which the invention is applied to an oil pressure supply apparatus for a transmission of a motor vehicle will be described by reference to the drawings.

Figure 1:
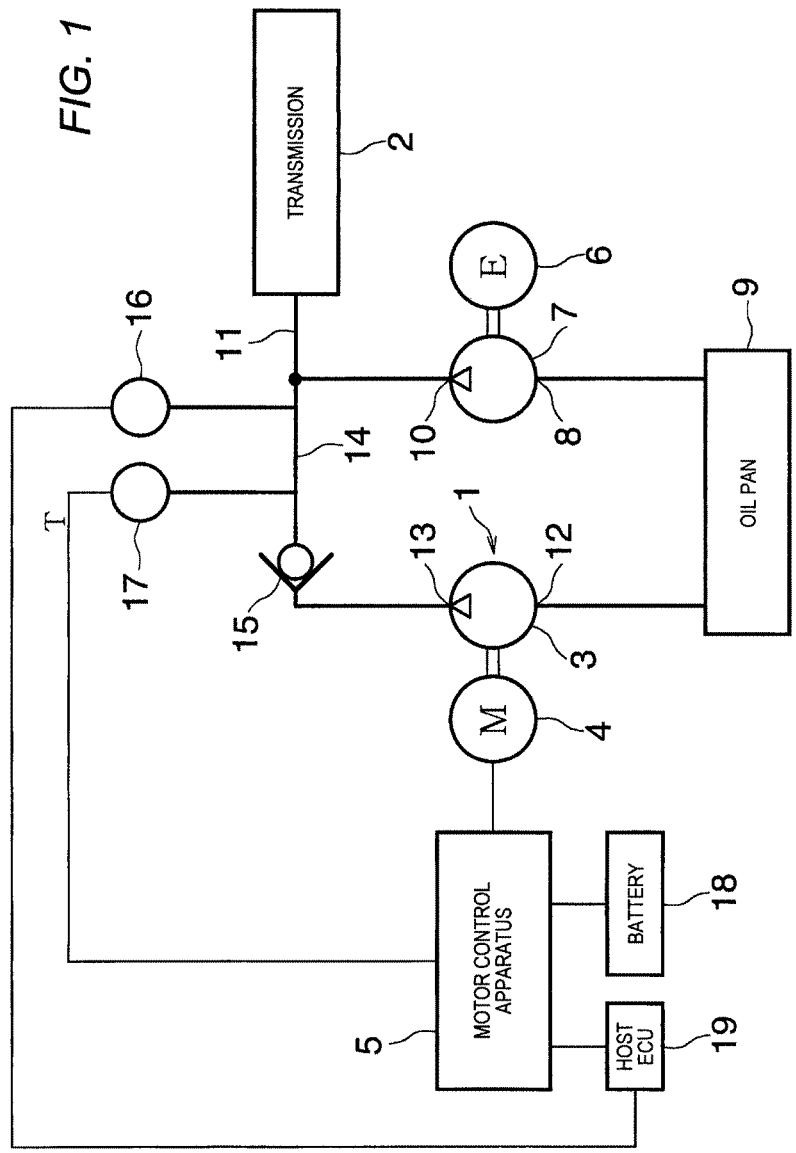
FIG. 1 is a schematic block diagram showing an embodiment in which an electric pump unit according to the embodiment of the invention is applied to an oil pressure supply apparatus for a transmission of a motor vehicle.

FIG. 1 is a schematic block diagram showing an example of an oil pressure supply apparatus for supplying oil pressure to a transmission (a continuously variable transmission) of a motor vehicle In FIG. 1, a transmission electric pump unit (1) is provided in the oil pressure supply apparatus. This electric pump unit (1) is used to supply an assisting oil pressure to compensate for an oil pressure reduction which occurs when a start-stop function is executed and includes a pump (3) which is an oil supplying auxiliary pump, a pump driving electric motor (4) and a motor control apparatus (5) for controlling the motor (4).

The motor (4) is a sensorless-controlled, brushless DC motor, and the auxiliary pump (3) is an internal gear pump. Preferably, the pump (3) and the motor (4) are provided integrally within a common housing. The motor control apparatus (5) may also be provided within the common housing for the pump (3) and the motor (4).

In addition to the electric pump unit (1) which has the auxiliary pump (3) described above, a main pump (7) which is driven by an engine (6) is provided in the oil pressure supply apparatus.

An oil suction port (8) of the main pump (7) is connected to an oil pan (9), and an oil discharge port (10) is connected to the transmission (2) by way of a main oil discharge path (11). An oil suction port (12) of the auxiliary pump (3) is connected to the oil pan (9), and an oil discharge port (13) is connected to the main oil discharge path (11) by way of an auxiliary oil discharge path (14). A check valve (15) is provided along the auxiliary oil discharge path (14) to prevent a reverse flow of oil from the side of the main oil discharge path (11) to the auxiliary pump (3). An oil pressure sensor (16) and an oil temperature sensor (17) are provided along the main oil discharge path (11).

A battery (18), which is a DC current source, and a host ECU (a host controlling apparatus) (19), which is a computer for controlling the engine (6) and the transmission (2), are connected to the motor control apparatus (5). The host ECU (19) monitors oil pressure in the main oil discharge path (11) from an output of the oil pressure sensor (16) and outputs an auxiliary pump stopping signal when the oil pressure is equal to or higher than a set value and an auxiliary pump driving signal when the oil pressure is lower than the set value to the motor control apparatus (5).

When the host ECU (19) outputs the auxiliary pump stopping signal, the motor control apparatus (5) stops the driving of the motor (4) to stop the driving of the auxiliary pump (3), whereas when the host ECU (19) outputs the auxiliary pump driving signal, the motor control apparatus (5) drives the motor (4) to drive the auxiliary pump (3).

When the engine (6) is driven, the main pump (7) is driven by the engine (6) driven, and normally, the oil pressure in the main oil discharge path (11) is equal to or higher than the set value, whereby the driving of the auxiliary pump (3) is stopped. As this occurs, oil is supplied from the main pump (7) to the transmission (2) by way of the main oil discharge path (11). Then, the oil is prevented from reversely flowing from the main oil discharge path (11) to the auxiliary pump (3) by the check valve (15).

When the engine (6) is stopped, normally, the oil pressure in the main oil discharge path (11) is almost 0 and hence is lower than the set value, whereby the auxiliary pump (3) is driven. This allows the oil to be supplied from the auxiliary pump (3) to the auxiliary oil discharge path (14) by way of the main oil discharge path (11).

Although the engine (6) is driven, in the event that the oil pressure in the main oil discharge path (11) is lower than the set value, the auxiliary pump (3) is driven, whereby the oil is supplied from the auxiliary pump (3) to the main oil discharge path (11) by way of the auxiliary oil discharge path (14).

When the auxiliary pump (3) is driven, the host ECU (19) issues an operation command to the electric pump unit (1) at a stage where an idling condition is met, and the motor control apparatus (5) of the electric pump unit (1) controls the motor (4) based on a current command value from the host ECU (19).

Figure 2:
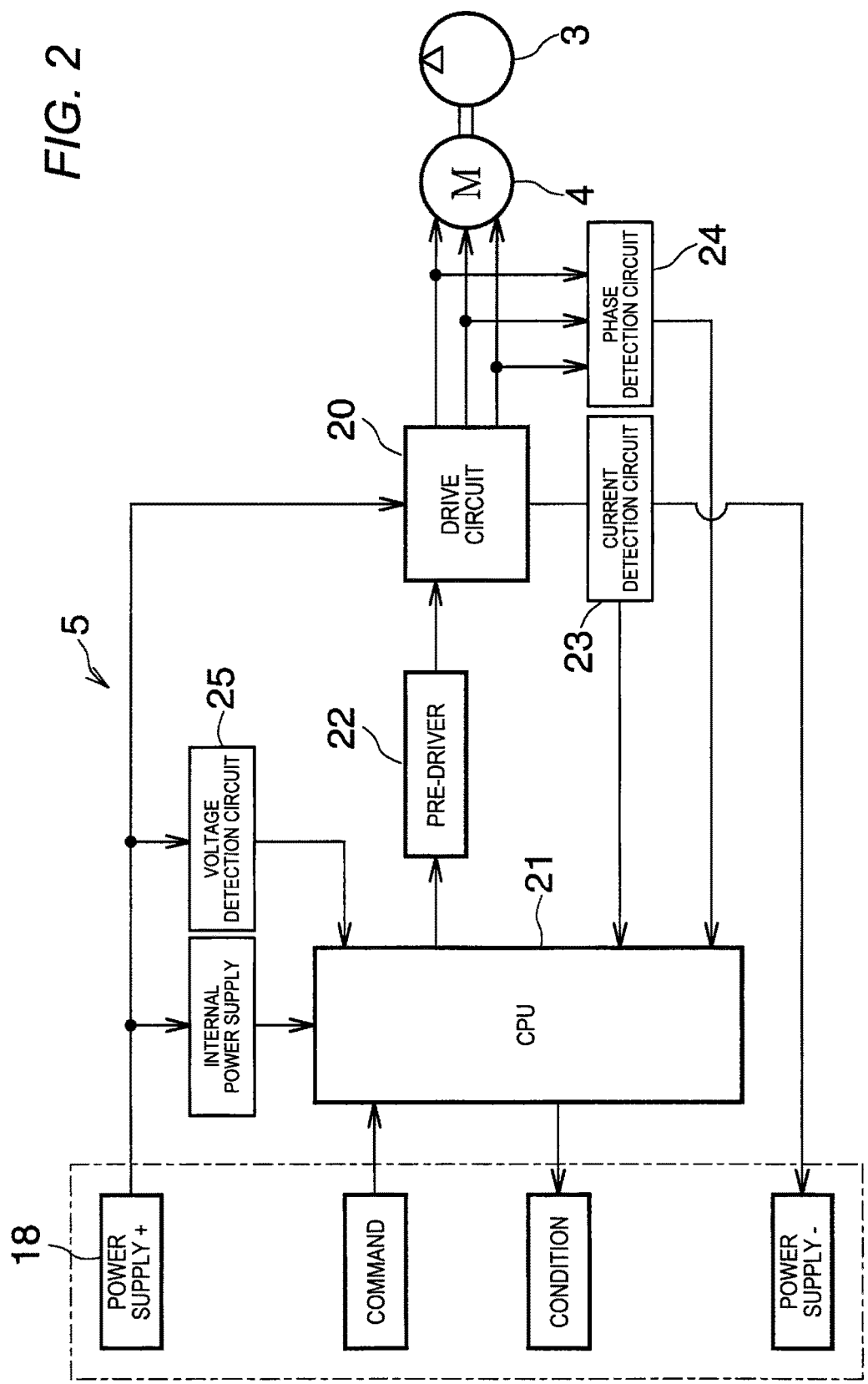
FIG. 2 is a block diagram showing an example of a schematic configuration of hardware of a motor control apparatus according to the embodiment of the invention.

FIG. 2 is a schematic block diagram showing a specific example of hardware of the motor control apparatus (5). The motor control apparatus (5) uses the battery (18) as an internal power supply and controls the motor (4) through a one-side PWM system. The motor control apparatus (5) includes a drive circuit (20) which drives the motor (4), a CPU (a control unit) (21) which includes a motor control signal output unit for controlling the drive circuit (20), a pre-driver (22) which outputs gate driving signals to switching devices which configure the drive circuit (20), a current detection circuit (23) which detects an input current of the drive circuit (20), a phase detection circuit (24) which detects a phase of a rotor of the motor (4), and a voltage detection circuit (25) which detects a power supply voltage. The CPU 21 includes at least a processing unit (a processor) and a storage unit. For example, one or more programs and various data are stored in the storage unit, and the programs can be executed by the processor.

The hardware configuration shown in FIG. 2 is basically generally known, and a known appropriate configuration can be adopted therefor.

The drive circuit (20) is a switching circuit which includes a plurality of switching devices (not shown) which control energization from the battery (18) to the motor (4). The CPU (21) estimates a rotating position of the rotor (not shown) of the motor (4) from a phase voltage of each of phases of the motor (4) and controls the switching devices of the drive circuit (20) through a PWM system based on the estimated rotating position of the motor, whereby the energization to the motor (4) is controlled. The current detection circuit (23) detects an input current to the drive circuit (20) and an output therefrom is input into the CPU (21). The phase detection circuit (24) detects a phase of the rotor of the motor (4) and an output therefrom is input into the CPU (21) for use in obtaining a rotating speed of the motor (4). A DC current voltage of the battery (18) is applied to the drive circuit (20) and the CPU (21), which constitutes an input voltage to the drive circuit (20).

Figure 3:
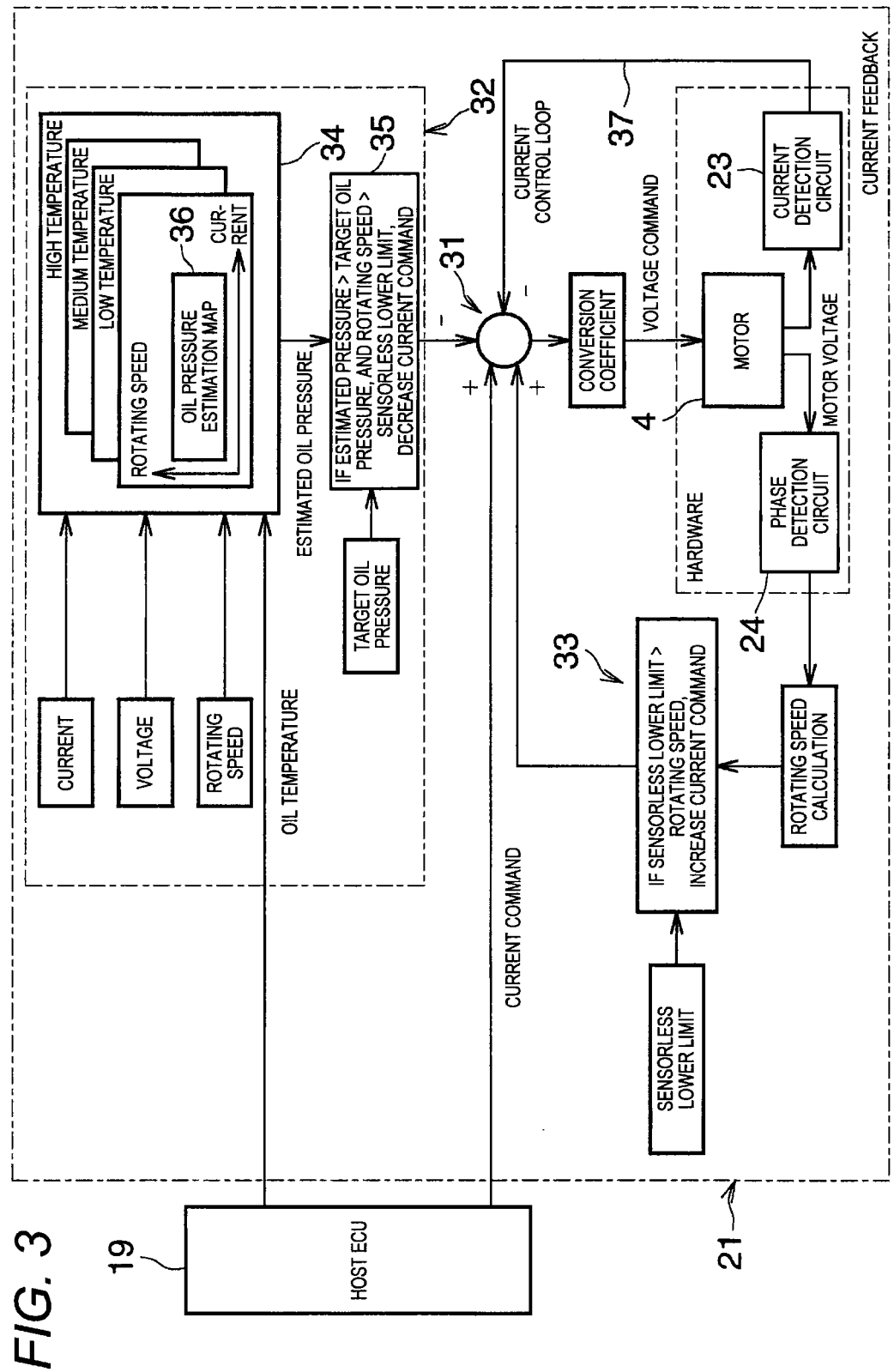
FIG. 3 is a block diagram showing an example of a schematic configuration of software of the motor control apparatus according to the embodiment of the invention.

FIG. 3 shows a software configuration of the CPU (21). In the figure, the CPU (21) corrects a current command value from the host ECU (19) based thereon to output a motor control signal. The CPU (21) includes a control signal output unit (31) which outputs a motor drive signal based on the current command value from the host ECU (19), an excessive output suppression control unit (32) which suppresses an excessive output by reducing the current command value from the host ECU (19), and a minimum output maintaining control unit (33) which controls the maintaining of a minimum rotating speed for a sensorless control by increasing the current command value from the host ECU (19).

The excessive output suppression control unit (32) includes an oil pressure estimating unit (34) and a current command value correction amount calculating unit (35) which compares an estimated oil pressure obtained at the oil pressure estimating unit (34) with a target oil pressure to obtain a reduction amount of a current command value which is input into the control signal output unit (31) from the host ECU (19). The target oil pressure is, for example, a set value which is stored in the storage unit of the CPU (21).

The control signal output unit (31) obtains a current command value by executing a current control, and a voltage command value to which a conversion coefficient is imparted to cause the current command value to follow an actual current value. The control signal output unit (31) has a current control loop (37) which executes a current feedback control so as to cause the current value to follow the actual current value.

Figure 4:
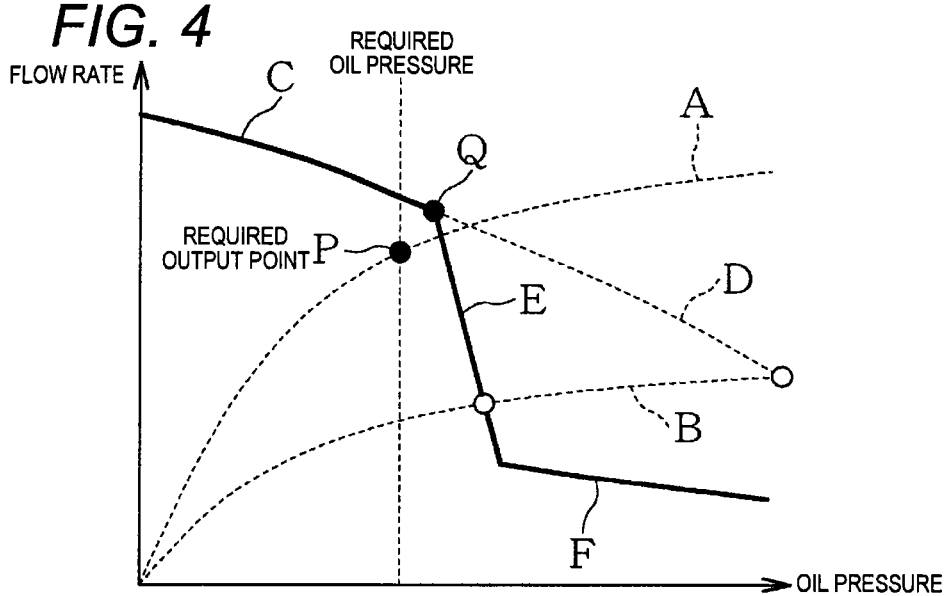
FIG. 4 is a graph showing a typical example of an oil pressure-flow rate curve which is an output characteristic of a pump which is obtained by the motor control apparatus for an electric pump unit according to the embodiment of the invention.

As will be described later, the excessive output suppression control unit (32) is configured to reduce the current command value from the host ECU (19). The minimum output maintaining control unit (33) compares a lower limit rotating speed (a sensorless lower limit) for a sensorless control and the actual rotating speed of the motor (4) which is obtained from the phase of the rotor which is obtained at the phase detection circuit (24) to increase the current command value from the host ECU (19) when the actual rotating speed of the motor (4) is smaller. A sensorless lower limit value is stored in, for example, the CPU (21). FIG. 4 shows a characteristic of the auxiliary pump (hereinafter, referred to as a "pump") (3) which can be realized by the provision of the excessive output suppression control unit (32) and the minimum output maintaining control unit (33).

In FIG. 4, curves A and B which are indicated by broken lines show load curves which takes a variation of the transmission (2) into consideration. A denotes a load curve when a leakage from a CVT which is the transmission (2) is maximum, and B denotes a load curve when the CVT leakage is minimum. The pump (3) is required to output an output which exceeds a required output point P on the load curve when the CVT leakage is maximum. An oil pressure-flow rate curve of the pump (3) which can support the requirement requires a portion C which is indicated by a sold line. The pump (3) which has such an oil pressure-flow rate curve has a portion which is indicated by a broken line D and where the flow rate gradually (continuously) decreases as the oil pressure increases when no additional control is executed. The portion indicated by the broken line D is larger than the required oil pressure, and therefore, although there is caused no such situation that the oil pressure becomes insufficient, oil pressure larger than required (an excessive output) is produced with respect to the broken line B which is the load curve when the CVT leakage is minimum. This excessive output is not preferable from the viewpoint of energy saving and suppression of the generation of heat and noise.

Then, in executing the control by the motor control apparatus (5) of the embodiment of the invention, an oil pressure-flow rate curve indicated by a solid line E in which the output (oil pressure-flow rate) is reduced drastically and quickly at a point Q as an inflection point is followed after a portion indicated by a solid line C (that is, after passing the required output point P). Additionally, a minimum rotating speed is set for the motor (4) to execute the sensorless control, and a minimum curve portion F is set so as to ensure a certain degree of flow rate even with a large oil pressure.

The variation of the transmission (2) is taken into consideration by controlling the motor (4) so that the output of the pump (3) follows the oil pressure-flow rate curve indicated by the solid line C which has the inflection point Q, the solid line E and the solid line F, whereby the required output is satisfied even for an upper limit of the variation of the transmission (2). Moreover, the pump (3) can be controlled so as not to output excessively.

A value detected by the oil pressure sensor (16) in the main oil discharge path (11) is not used as the oil pressure, but the oil pressure is estimated based on the power supply current (or the motor current) of the electric pump unit (1) and the motor rotating speed. More specifically, a discharge oil pressure is estimated at the oil pressure estimating unit (34) by using an oil temperature obtained from the host ECU (19), the power supply current (or the motor current) obtained within the electric pump unit (1), the motor rotating speed and the power supply voltage. The oil pressure estimating unit (34) has a data table (an oil pressure estimation map (36)) which contains motor rotating speeds and currents which are measured in advance in relation to oil temperatures, and an estimated oil pressure is obtained as a value resulting from multiplying a value applied to the data table by a ratio of reference voltage to power supply voltage of the data table.

The oil pressure estimation map (36) is stored in the CPU (21). When an operation command is issued from the host ECU (19) to the electric pump unit (1), the motor (4) is controlled so that an estimated oil pressure obtained from this oil pressure estimation map (36) becomes a target oil pressure. Then, an excessive output suppression control is executed which saves energy and suppresses the generation of heat and noise by determining the target oil pressure so as to satisfy the oil pressure-flow rate curve indicated by the solid line C, the solid line E and the solid line F shown in FIG. 4.

Additionally, in place of adopting the form using the oil pressure estimation map (36), it is possible to store an oil pressure estimation operation expression which uses oil temperature, power supply current (or motor current), motor rotating speed and power supply voltage to estimate oil pressure based on the oil pressure estimation operation expression.

Figure 5:
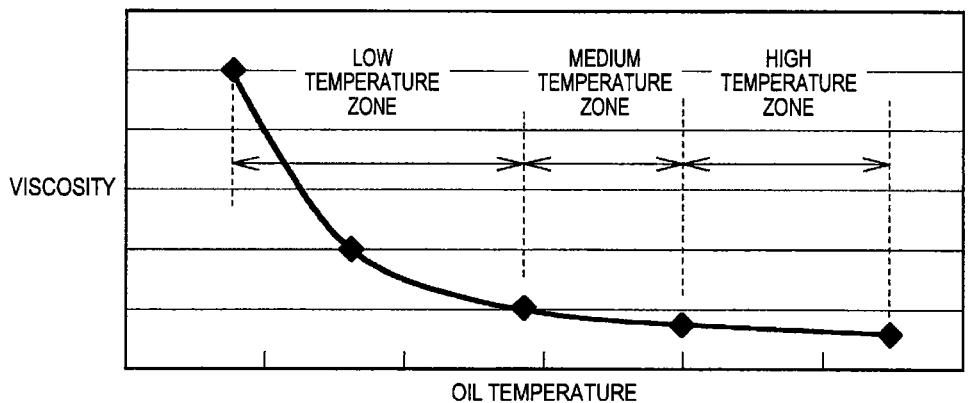
FIG. 5 is a graph showing a relationship between oil temperature and viscosity of oil which is used in the motor control apparatus for the electric pump unit according to the embodiment of the invention.

It is necessary to enhance the accuracy with which the oil pressure is estimated in order to ensure the required output. In the event that only a standard map which supports one condition (a standard temperature) as the oil pressure estimation map (36), since the viscosity of the oil changes largely depending on oil temperatures as shown in FIG. 5, in a high temperature zone, the output is shifted slightly too high, whereas in a low temperature zone, the output is shifted slightly too low. In either case, the oil pressure is likely to deviate from oil pressure for an optimum control.

Figure 6:
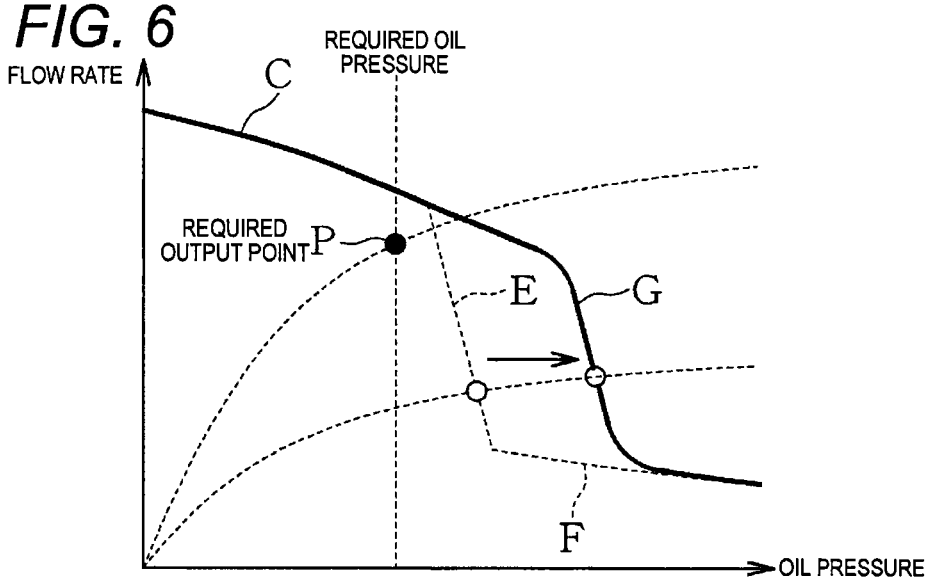
FIG. 6 is a graph showing a pump output characteristic obtained by the motor control apparatus for the electric pump unit according to the embodiment of the invention when the oil temperature is high.

Namely, when executing a control based on a standard temperature oil pressure estimation map (36) in the high temperature zone, due to the low viscosity of the oil, a control that actually occurs is such that an output indicated by a solid line G is shifted to a higher side with respect to an oil pressure-flow rate curve indicated by a solid line C, a broken line E and a broken line F which represents an optimum control, as shown in FIG. 6, resulting in an excessive output.

Then, an oil pressure estimation map which is different from the standard temperature oil pressure estimation map (36) is used as the high temperature zone oil pressure estimation map, whereby it is possible to suppress the occurrence of such an excessive output in the high temperature zone.

Figure 7:
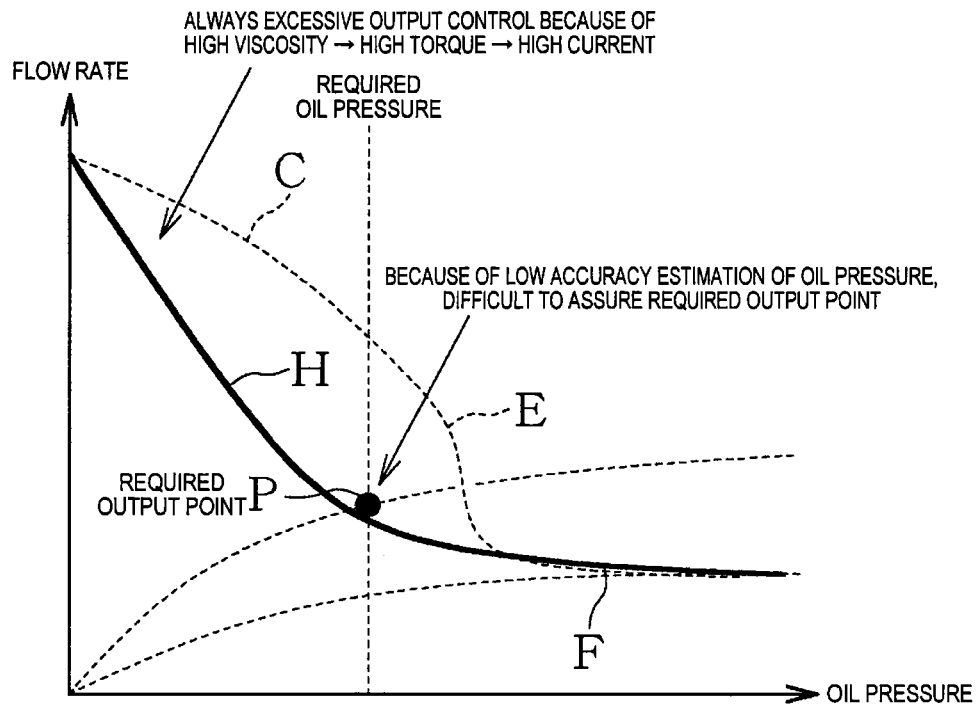
FIG. 7 is a graph showing a pump output characteristic obtained by the motor control apparatus for the electric pump unit according to the embodiment of the invention when the oil temperature is low.

Additionally, the control is executed based on the standard temperature oil pressure estimation map (36) in the low temperature zone, due to the high viscosity of the oil, a control actually occurs is such that an output indicated by a solid line H is shifted to a lower side with respect to an oil pressure-flow rate curve indicated by a broken line C, a broken line E and a solid line F which represents an optimum control, as shown in FIG. 7, resulting in an insufficient output which is less than the required output.

Then, an oil pressure estimation map which is different from the standard temperature oil pressure estimation map (36) is used as the low temperature zone oil pressure estimation map, whereby it is possible to suppress the occurrence of such an insufficient output which is less than the required output in the low temperature zone.

In this way, the whole of the temperature zones is not covered by the single standard temperature oil pressure estimation map (36), and the influence of the change in viscosity of the oil that occurs based on the difference in oil temperature is taken into consideration. This suppresses the occurrence of excessive output in the high zone due to the estimated oil pressure being slightly too low, while in the low temperature zone, it suppresses the occurrence of such a situation that the optimum output cannot be maintained due to the estimated oil pressure being slightly too high.

As to the oil pressure estimation map (36) prepared for a plurality of temperature zones, a plurality of oil pressure estimation maps may be provided for the respective temperature zones. Alternatively, the oil pressure estimation map (36) may include a standard map which is set for a standard temperature and adjusting coefficients which are set to correspond to the respective temperature zones.

In the case of the former, for example, the oil temperature zone is divided into three zones of a low temperature zone, a medium temperature zone and a high temperature zone, and three oil pressure estimation maps (36) are prepared. In the case of the latter, a standard map is prepared for a standard temperature (a medium temperature), and arithmetic operations are performed on an estimated oil pressure obtained based on the standard map by the use of certain adjusting coefficients (constants or numeric expressions) to obtain low temperature and high temperature oil pressure estimation maps (36).

As to oil pressure information, as shown in FIG. 1, the oil temperature sensor (17) is provided along the main oil discharge path (11), and the host ECU (19) which governs the start-stop function monitors the oil temperature information from the oil temperature sensor (17). Thus, the host ECU (19) should send the oil temperature information to the electric pump unit (1) so as to switch the oil pressure estimation maps (36) based on the oil temperature information. The oil temperature information used here should be, for example, any of the low temperature, the medium temperature and the high temperature.

In order to ensure the compatibility between the simple arithmetic operation and ensuring accurate estimated oil pressures, although it is preferable that the number of oil zones be three of low temperature, medium temperature and high temperature as described above, the invention is not limited thereto. Therefore, two or more oil temperature zones can be set.

Figure 8:
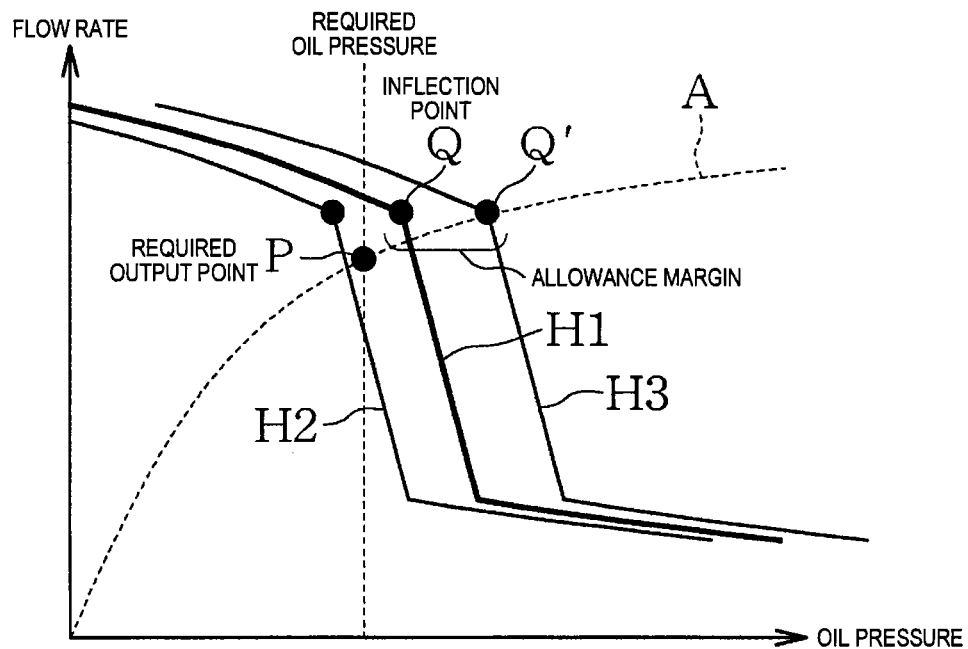
FIG. 8 is a graph illustrating an allowance margin in a high-temperature zone of an output characteristic obtained by the motor control apparatus for the electric pump unit according to the embodiment of the invention.
Figure 9:
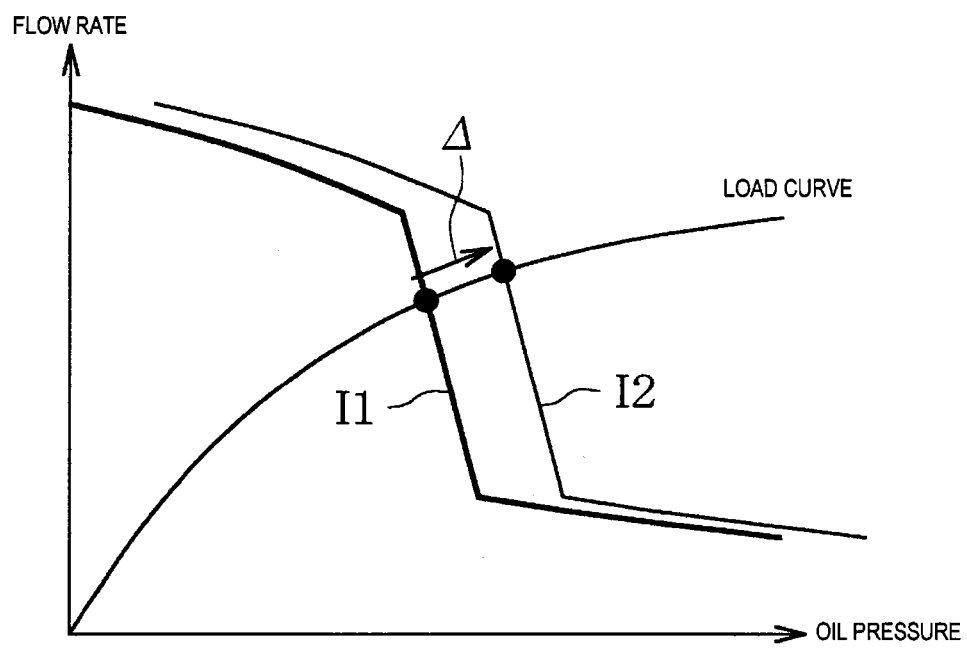
FIG. 9 is a graph showing a change in an output characteristic of the pump obtained by the motor control apparatus for the electric pump unit according to the embodiment of the invention when temperature zones are switched.

In the above description, when the idling of the engine is stopped, there occurs such a situation that the oil temperature that is in the range of the high temperature zone is reduced due to the influence of outside temperatures to fall in the range of the medium temperature zone. As this occurs, as shown in FIG. 8, when the oil temperature is high, according to the control described above, the pump (3) is controlled so as to follow a thick solid line H1 to satisfy the required output point P. However, in the high temperature zone, due to the viscosity of the oil being lower than in the low temperature zone, with the same current value, the motor rotating speed becomes faster, which results in the estimated oil pressure being estimated high. Thus, in the event that the high temperature zone oil pressure estimation map (36) continues to be used while the actual oil temperature is reduced, the pump (3) is controlled to follow a thin sold line H2, resulting in a possibility that the oil pressure becomes lower than the required output point P. Then, to cope with this oil temperature reduction condition, it is preferable to set an oil pressure-flow rate curve which follows a thin solid line H3 which provides an allowance margin. Specifically speaking, an inflection point Q' of a high temperature zone pump output characteristic should be set so as to still ensure the allowance margin relative to the inflection point Q in the standard oil pressure-flow rate curve H1 even though the oil temperature decreases, for example, 10° C. By setting so the inflection point Q', even though the oil temperature decreases from one temperature zone to another after stop idling, since the allowance is given to the inflection point, an insufficient oil pressure never occurs. An allowance margin which corresponds to a predetermined temperature decrease is actually measured, and the measured allowance margin is stored in the storage unit of the CPU (21).

In addition, in the above description, the oil pressure estimation maps (36) which correspond to the plurality of oil temperature zones are used, and when the oil temperature changes to fall in the different oil temperature zone, the oil pressure estimation maps (36) are switched from one to another, which changes the rotating speed of the motor (4). Namely, when the oil temperature decreases 1° C. from a lower limit of the range of the high temperature zone, the oil pressure estimation map (36) is switched from the high temperature one to the medium temperature one, whereby a target curve of the output characteristic of the pump (3) changes from a curve indicated by a solid line I1 to a curve indicated by a thin solid line I2 in a discontinued fashion. When the motor (4) is controlled so as to correspond to the change Δ, the rotating speed of the motor (4) increases drastically and quickly, the frequency of noise generated by the pump (3) also changes drastically and quickly. When the frequency of this change is large, the noise becomes remarkable, and there may be a situation in which the user is caused to feel the sensation of physical discomfort.

To cope with this, it is preferable that the control signal output unit (31) includes a filtering process unit which executes a filtering process to prevent the drastic and quick change of the current command value. Consequently, the current command value which is corrected by the excessive output suppression control unit (32) and the minimum output maintaining control unit (33) is prevented from changing drastically and quickly by the filtering process and is then output to the drive circuit (20). This makes the rotating speed of the motor (4) change moderately, whereby the user can be prevented from being caused to feel the sensation of physical discomfort even though he or she hears the noise generated by the pump (3) in association with the change in rotating speed of the motor (4). Since the oil temperature does not change sharply and quickly, by executing a first-order lag filtering process with a response speed of the order of 5 to 15 seconds, the rotating speed of the motor (4) is allowed to change along a predetermined gradient or lower. A moving average filtering process may be executed in place of the first-order lag filtering process.

In the embodiment, the reduction amount of the current command value according to the oil temperature is acquired by the oil pressure estimation unit (34) obtaining the estimated oil pressure based on the oil temperature information. However, the invention is not limited thereto. Hence, the reduction amount of the current command value according to the oil temperature may be acquired by correcting the set value of the target oil pressure based on the oil temperature information. Namely, at least one of the estimated oil pressure and the target oil pressure which are compared with each other at the current command value correction amount calculating unit (35) should be corrected based on the oil temperature information.

In the embodiment, the driving and stopping of the auxiliary pump (3) is switched based on the oil pressure in the main oil discharge path (11). However, a configuration can be adopted in which the auxiliary pump (3) is stopped while the engine (6) is driven, whereas when the engine (6) is stopped, the auxiliary pump (3) is driven. The configuration of the electric pump unit (1) is not limited to that described in the embodiment and hence can be modified as required. In addition, the invention can also be applied to other apparatuses than the oil pressure supply apparatus for the transmission of the motor vehicle.

DESCRIPTION OF REFERENCE SIGNS (1): electric pump unit; (3): pump; (4): electric motor; (19): host ECU (host control apparatus); (21): CPU (control unit); (32): excessive output suppression control unit; (34) oil pressure estimating unit; (35): current command value correction amount calculating unit; (36): oil pressure estimation map.

The invention claimed is:

1. A motor control apparatus which controls, based on oil pressure, an electric motor which drives a pump which sucks and discharges oil, said motor control apparatus comprising:
   a control unit comprising a control signal output unit which outputs a motor control signal; and
   a drive circuit which operates in response to an input of the motor control signal to supply driving electric power to the electric motor,
   wherein the control unit further comprises an excessive output suppression control unit which suppresses an excessive output by reducing a current command value from a host control apparatus,
   wherein the control signal output unit obtains the motor control signal by adding a reduction amount of the current command value obtained by the excessive output suppression control unit to the current command value from the host control apparatus,
   wherein the excessive output suppression control unit performs control based on an oil pressure-flow rate characteristic, which oil pressure-flow rate characteristic includes a first portion in which a flow rate gradually decreases as the oil pressure increases, a second portion corresponding to the flow rate at a minimum rotating speed set for the electric motor, and a third portion in which the oil pressure-flow rate characteristic drastically and quickly transitions from the first portion to the second portion after the oil pressure passes a required output point,
   wherein the excessive output suppression control unit comprises:
      an oil pressure estimating unit which estimates oil pressure based on at least a current and a rotating speed of the electric motor; and
      a current command value correction amount calculating unit which compares target oil pressure with the estimated oil pressure estimated by the oil pressure estimating unit, and which outputs the reduction amount of the current command value to the control signal output unit if the estimated oil pressure is higher than the target oil pressure,
   wherein one of a target oil pressure and an estimated oil pressure which are compared with each other by the current command value correction amount calculating unit is corrected based on oil temperature information.

2. The motor control apparatus according to claim 1, wherein the oil pressure estimating unit sets therein a oil pressure estimation map or an oil pressure estimation operation expression which indicates a correspondence between the current and rotation speed of the electric motor and the estimated oil pressure and which depends on oil temperature, and outputs the estimated oil pressure corrected by the oil temperature information to the current command value correction amount calculating unit.

3. The motor control apparatus according to claim 2, wherein the oil pressure estimation map comprises a plurality of maps prepared for a plurality of oil temperature zones, respectively, and
   wherein the oil pressure estimating unit obtains the estimated oil pressure by using, among the plurality of maps, a map of an oil temperature zone corresponding to the oil temperature information.

4. The motor control apparatus according to claim 2, wherein the oil pressure estimation map comprises: a standard map set for a standard temperature; and adjustment coefficients set to correspond to a plurality of oil temperature zones, respectively.

5. A motor control apparatus which controls, based on oil pressure, an electric motor which drives a pump which sucks and discharges oil, said motor control apparatus comprising:
   a control unit comprising a control signal output unit which outputs a motor control signal; and
   a drive circuit which operates in response to an input of the motor control signal to supply driving electric power to the electric motor,
   wherein the control unit further comprises an excessive output suppression control unit which suppresses an excessive output by reducing a current command value from a host control apparatus,
   wherein the control signal output unit obtains the motor control signal by adding a reduction amount of the current command value obtained by the excessive output suppression control unit to the current command value from the host control apparatus,
   wherein the excessive output suppression control unit comprises:
      an oil pressure estimating unit which estimates oil pressure based on at least a current and a rotating speed of the electric motor; and a current command value correction amount calculating unit which compares target oil pressure with the estimated oil pressure estimated by the oil pressure estimating unit, and which outputs the reduction amount of the current command value to the control signal output unit if the estimated oil pressure is higher than the target oil pressure, and wherein one of a target oil pressure and an estimated oil pressure which are compared with each other by the current command value correction amount calculating unit is corrected based on oil temperature information, wherein the oil pressure estimating unit sets therein a oil pressure estimation map or an oil pressure estimation operation expression which indicates a correspondence between the current and rotation speed of the electric motor and the estimated oil pressure and which depends on oil temperature, and outputs the estimated oil pressure corrected by the oil temperature information to the current command value correction amount calculating unit, wherein the oil pressure estimation map comprises a plurality of maps prepared for a plurality of oil temperature zones, respectively, wherein the oil pressure estimating unit obtains the estimated oil pressure by using, among the plurality of maps, a map of an oil temperature zone corresponding to the oil temperature information, wherein an oil pressure-flow rate curve of the pump is set to satisfy a required oil pressure value, and comprises an inflection point which exceeds the required oil pressure value such that a flow rate decreases as the oil pressure increases from the inflection point, and wherein an oil pressure estimation map for a high oil temperature zone among the oil pressure estimation maps for the plurality of oil temperature zones provides an allowance margin so as to satisfy the required oil pressure value even when the oil temperature decreases by a predetermined amount.

6. The motor control apparatus according to claim 1, wherein the control signal output unit further comprises a filtering process unit which allows the rotating speed of the electric motor to change along a predetermined gradient or lower.

7. The motor control apparatus according to claim 1, wherein the oil pressure estimating unit corrects the oil pressure further based on a power supply voltage.

8. An electric pump unit comprising:
a pump which sucks and discharges oil;
an electric motor which drives the pump; and
the motor control apparatus according to claim 1.

9. A motor control apparatus which controls, based on oil pressure, an electric motor which drives a pump which sucks and discharges oil, said motor control apparatus comprising:
a control unit comprising a control signal output unit which outputs a motor control signal; and
a drive circuit which operates in response to an input of the motor control signal to supply driving electric power to the electric motor, wherein the control unit further comprises an excessive output suppression control unit which suppresses an excessive output by reducing a current command value from a host control apparatus, wherein the control signal output unit obtains the motor control signal by adding a reduction amount of the current command value obtained by the excessive output suppression control unit to the current command value from the host control apparatus, wherein the excessive output suppression control unit comprises:
an oil pressure estimating unit which estimates oil pressure based on at least a current and a rotating speed of the electric motor; and
a current command value correction amount calculating unit which compares target oil pressure with the estimated oil pressure estimated by the oil pressure estimating unit, and which outputs the reduction amount of the current command value to the control signal output unit if the estimated oil pressure is higher than the target oil pressure, and wherein one of a target oil pressure and an estimated oil pressure which are compared with each other by the current command value correction amount calculating unit is corrected based on oil temperature information, wherein the oil pressure estimating unit sets therein a oil pressure estimation map or an oil pressure estimation operation expression which indicates a correspondence between the current and rotation speed of the electric motor and the estimated oil pressure and which depends on oil temperature, and outputs the estimated oil pressure corrected by the oil temperature information to the current command value correction amount calculating unit, wherein the oil pressure estimation map comprises: a standard map set for a standard temperature; and adjustment coefficients set to correspond to a plurality of oil temperature zones, respectively, wherein an oil pressure-flow rate curve of the pump is set to satisfy a required oil pressure value, and comprises an inflection point which exceeds the required oil pressure value such that a flow rate decreases as the oil pressure increases from the inflection point, and wherein an oil pressure estimation map for a high oil temperature zone among the oil pressure estimation maps for the plurality of oil temperature zones provides an allowance margin so as to satisfy the required oil pressure value even when the oil temperature decreases by a predetermined amount.

* * * * *